THIN FILM CIRCUITRY

Filed June 28, 1962

INVENTORS
IRVING AMES
LAWRENCE V. GREGOR
ALAN L. LEINER
ARNOLD M. TOXEN
BY Elmer W. Galbi[illegible]
ATTORNEY United States Patent Office 3,239,374
Patented Mar. 8, 1966

3,239,374

THIN FILM CIRCUITRY

Irving Ames, Peekskill, Lawrence V. Gregor, Chappaqua, Alan L. Leiner, New York, and Arnold M. Toxen, Peekskill, N.Y., assignors to International Business Machines Corporation, New York, N.Y., a corporation of New York Filed June 28, 1962, Ser. No. 206,084
8 Claims. (Cl. 117—212)

This invention relates to electrical circuitry and, more particularly, it relates to a method of fabricating thin film conductors by vapor deposition.

Thin film circuitry can be fabricated by depositing the circuitry through a mask onto a substrate. The mask through which the circuitry is deposited has slots therein through which the individual conductors are deposited. The width of the slots define the width of the conductors and slight dust particles, hairs, or burrs which are present along the edges of the slots cause a decrease in the size of the conductors. If the conductor being deposited is very narrow, a dust particle or slight burr on the edge of the slot may cause a break in the conductor. Furthermore, there is a lower limit on the width of a slot which can be cut in a mask and, hence, there is a lower limit on the width of conductor which can be fabricated by conventional masking techniques.

The present invention overcomes these difficulties. It provides a method of depositing a very narrow conductor the thickness of which is totally independent of the narrowest slot which can be made in a mask. Furthermore, the width of a narrow conductor fabricated according to the present invention is not appreciably affected by deformities which may be present in the edges of the slots in the mask which is used.

According to another feature of the present invention, when a relatively wide conductor is being deposited, dust particles or slight burrs along the edge of the slots in the mask through which the circuitry it deposited cause an increase rather than a decrease in the width of the conductor.

The grain structure and, hence, the continuity of a thin film fabricated by vapor deposition is affected by the density of the nucleating sites present on the surface where the film is deposited. If there is a high density of nucleating sites, the film has a finer grain structure and is more continuous than if there is a low density of nucleating sites. The density of nucleating sites can be controlled to some extent by depositing a layer of nucleating material before the film is deposited. The density of the nucleating sites and, hence, the grain structure and the continuity of the film depends not only upon the presence of the nucleating material but also upon the thickness of the layer of nucleating material.

For certain relative thicknesses between the film and the nucleating layer the film has a fine grain structure and it is continuous and for certain different relative thicknesses between the film and the nucleating layer the film agglomerates into a coarse grain structure and it is discontinuous (where a film is agglomerated and discontinuous it is a nonconductor). The present invention utilizes the above principle in order to fabricate conductors heaving certain desired shapes.

An object of the present invention is to provide an improved method for defining the geometry of a conductor.

Another object of the present invention is to provide an improved method for defining the edges of a thin film conductor.

Still another object of the present invention is to provide an improved method of fabricating a narrow thin film conductor.

Yet another object is to provide a method for fabricating conductors having a certain minimum width.

The foregoing and other objects, features and advantages of the invention will be more apparent from the following more particular description of preferred embodiments of the invention, as illustrated in the accompanying drawings.

Apparatus for depositing thin film conductors by vapor deposition is known. Such apparatus is, for example, described in copending application Serial No. 135,920 filed September 5, 1961 by J. Priest and H. L. Caswell entitled "Method for Depositing Silicon Monoxide Films" which is assigned to the assignee of the present invention. Since such apparatus is known in the art and since the particular apparatus used forms no part of the present invention, such apparatus is not shown or described herein.

Figure 1:
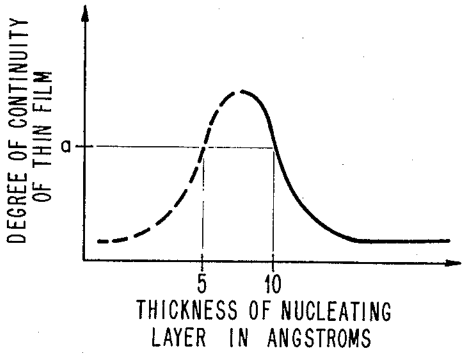
FIGURE 1 is a graph which shows the degree of continuity of a conductor with respect to the thickness of the underlayer used.

The continuity of certain thin films is affected by the presence of a nucleating layer beneath the film. Furthermore, the continuity of these films is affected by thickness of the nucleating layer. For example, for an indium film 2,000 angstroms thick deposited at a rate of 60 angstroms per second in a chamber evacuated to $10^{-7}$ Torr over a gold nucleating layer, continuity is a function of the thickness of the nucleating layer as shown in FIGURE 1. Without a nucleating layer the film agglomerates and is not continuous. If a nucleating layer between 5 and 10 angstroms thick is used, the agglomeration is decreased and the continuity of the film is appreciably increased. If the thickness of the nucleating layer is outside the 5 to 10 angstrom range, the film agglomerates and is discontinuous. The portion of the curve between zero and 5 angstroms is shown dotted since it is not possible to exactly determine the shape of this portion of the curve.

There is no easily defined quantitative measure of the continuity of a film; however, it is clear that if a film is discontinuous beyond a certain degree for all practical purposes it is a nonconductor. In the graph of FIGURE 1, a film which has less than "*a*" units of continuity is effectively a nonconductor and a film which has more than "*a*" units of continuity is effectively a conductor. Naturally, it should be understood that there is not an absolute and abrupt change from a conductor to a nonconductor. However, it can be said that as a film becomes more discontinuous, it becomes less of a conductor, or conversely, as the continuity of a film increases, it becomes a better conductor. For purposes of the following discussion, it is assumed that a film having less than "*a*" units of continuity is effectively a nonconductor.

The following is one possible explanation of the effect that a nucleating film has on an overlying film. In general, when a thin film is deposited on a base material, it does not "wet" the base material. Hence, the first particles of the film which are deposited tend to accumulate in clusters around slight irregularities on the base material. These irregularities are termed nucleating sites. The use of the proper amount of a nucleating material can increase the density of the nucleating sites. If there is a high density of nucleating sites when the first particles of a film are deposited, they form a large number of small clusters instead of forming a small number of relatively large clusters. The small clusters give the material a finer grain structure and they tend to make the material more continuous.

Figure 2:
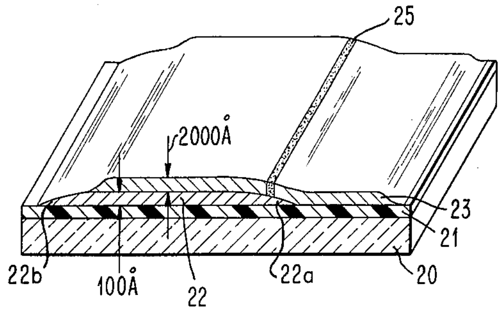
FIGURE 2 is a perspective view of overlapping layers deposited on a substrate in order to fabricate a very narrow thin film conductor.

FIGURE 2 shows how a very narrow indium conductor can be fabricated according to the present invention. The structure shown in FIGURE 2 includes a substrate 20 which is covered by a layer of insulating material 21. On top of insulating material 21 is gold nucleating layer 22 which is 100 angstroms thick (for purposes of illustration the thickness of layer 22 is greatly exaggerated in FIGURE 2) and a thin film 23 which is 2000 angstroms thick. Film 23 was deposited under conditions giving it the physical characteristics shown in FIGURE 1.

The gold nucleating layer 22 was deposited through a mask in a conventional manner. The edges **22*a* and 22*b* of the gold nucleating layer 22 are slightly tapered due to shadowing effects. That is, the edges of the gold nucleating layer 22** are not vertical. Instead they are slanted. This type of shadowing naturally happens when material is deposited through a mask by vapor deposition techniques. It is, for example, described in considerable detail in U.S. Patent 2,989,716 by A. E. Brennemann et al. entitled "Superconductive Circuits" which is assigned to the assignee of the present invention.

Somewhere along the slanted edge **22*a* of the gold nucleating layer 22, the thickness of layer 22 is between 5 and 10 angstroms thick. At this point the indium thin film 23 is continuous. Everywhere else the thin film 23 is discontinuous and, hence, effectively a nonconductor. That portion of film 23 which is continuous forms the very narrow conductor 25** (approximately 5 to 10 microns wide).

Figure 3A:
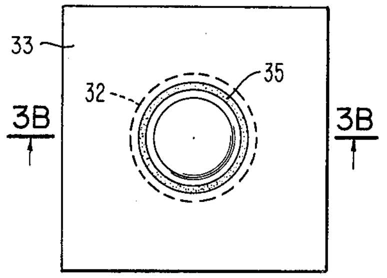
FIGURE 3A is a top view of a thin film deposited over a relatively circular underlayer.
Figure 3B:
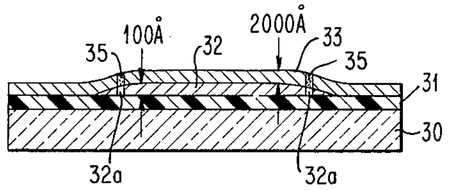
FIGURE 3B is a cross-sectional view of FIGURE 3A.

FIGURES 3A and 3B show how a conductor in the shape of a narrow closed ring can be formed. First, a segment of nucleating material 32 which is approximately 100 angstroms thick is deposited. The nucleating material 32 is then covered with film 33 which is 2000 angstroms thick deposited under conditions that give it the physical characteristics shown in FIGURE 1. Somewhere along the edges of segment 32 is a narrow ring of nucleating material **32*a* which is between 5 and 10 angstroms thick. Everything above this narrow ring film 33 is continuous and elsewhere film 33 is discontinuous. Hence, a narrow conductor 35** will be formed.

The width of conductors 25 and 35 can be controlled by controlling the slant of the edges of nucleating material (i.e., the rate at which the thickness of the nucleating material increases along its edges). The slant of the edges of the nucleating material can be controlled in two ways. First, by controlling the thickness of the center portion of the nucleating material and second, by controlling the width of the slanted edges. Controlling the thickness of the center portion of the nucleating material controls the slant of the edges.

The edges of the nucleating material have a very slight slant if the center portion of the nucleating material is very thin. Hence, if the center portion of the nucleating material is only slightly above the amount of nucleating material needed to give a fine grain structure, the width conductors 25 and 35 will be relatively wide. However, if the thickness of the center portion of the nucleating material is much more than that needed to give a fine grain structure the edges of the nucleating material have a relatively high degree of slant and conductors 25 and 35 are relatively narrow.

The width of the slanted edges of the nucleating material is controlled by controlling the distance between (a) the source of the evaporant, (b) the mask through which the evaporant passes and (c) the substrate on which the evaporant is deposited. If the source is relatively close to the mask and the mask is relatively far from the substrate, there is a large degree of shadowing and the edges are very wide. Such parameters as the shape of the openings in the mask, the temperature of the mask, etc., also have an effect upon the amount of shadowing. If the edges of the nucleating material are relatively wide, conductors 25 and 35 are relatively wide. If the mask is positioned relatively close to the substrate and the source is positioned relatively far from the substrate, the edges of the nucleating material are relatively narrow and, likewise, conductors 25 and 35 are relatively narrow.

In the specific example shown, the source of the evaporant was positioned eight inches from the mask through which the nucleating material was evaporated and the mask was positioned eight mils from the substrate. The thickness of the nucleating layer is 100 angstroms. The resulting slanted edge of the nucleating material is such that the width of conductors 25 and 35 is 5 to 10 microns. Layers 22 and 23 can be any convenient width since the only area of importance is where conductor 23 covers edges **23*a***.

It should be particularly noted that the width of conductors 25 and 35 is not appreciably affected by irregularities in the shape of the segment of nucleating material (i.e., by irregularities in the edges of the slot in the mask through which the nucleating material is deposited). Irregularities in the shape of the segment of nucleating material may cause a bend in the conductors 25 or 35 but it does not affect the continuity of the conductor.

The present invention is not limited to any particular type of thin film or to any particular nucleating material. Any film which has the type of physical characteristic shown in FIGURE 1 can be used. For example, the nucleating layers 22 and 32 may be silver or copper and the thin films 23 and 33 may be tin or lead. With different materials slightly different pressures and deposition rates may be needed to give the physical characteristics shown in FIGURE 1.

The thickness of films 23 and 33 depends upon the amount of contrast in continuity desired between the segment of films which form conductors 25 and 35 and the remaining portions of films 23 and 33. The greatest degree of contrast between the continuity of conductors 25 and 35 and the remaining portions of films 33 and 43 is obtained if films 23 and 33 are between one thousand and three thousand angstroms thick. The discontinuous portions of the film can be made even more discontinuous by heating the entire structure after the films have been deposited.

It should be understood that the thickness of the nucleating layer required to make a film continuous is somewhat of an approximation since thicknesses of 5 and 10 angstroms cannot in fact be directly measured. It is, however, known that; (a) if no nucleating layer is used the films 23 and 33 are discontinuous and, hence, nonconductors; (b) if a very thick nucleating layer is used, films 23 and 33 are discontinuous and, hence, nonconductors; and, (c) that somewhere between the thin nucleating layer and the thick nucleating layer there is a very small range of thickness of the nucleating layers for which films 23 and 33 are continuous. It is estimated that this range is somewhere between 5 and 10 angstroms in thickness; however, this is merely an estimate which has no bearing upon the invention. There is, in fact, a relatively narrow range and the exact location of this range is not particularly important so long as the thickness of the segment of nucleating material is in excess of the upper limit of the range. A gold layer 5 to 10 angstroms thick is approximately a monolayer of gold atoms.

The composition and thickness of insulating layers 21 and 31 is not particularly relevant to the present invention. However, there may, for example, be layers of silicon monoxide which are several thousand angstroms thick. Their purpose is to prepare a relatively clean surface on which to deposit the nucleating layer.

Figure 4A:
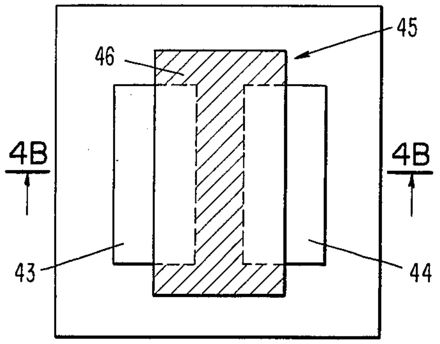
FIGURE 4A is a planar view of a specially shaped conductor.
Figure 4B:
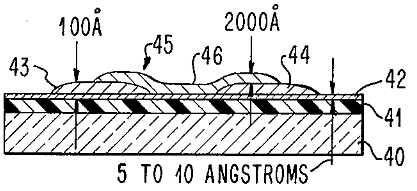
FIGURE 4B is a cross-sectional view of FIGURE 4A.

FIGURES 4A and 4B show how a conductor 46 which has at least a certain width can be fabricated. The structure includes substrate 40, a layer of insulating material 41, a thin layer of nucleating material 42 which is between 5 and 10 angstroms thick and which covers the entire substrate, two segments of nucleating material 43 and 44 which are 50 angstroms thick, and a film 46 which is 2000 angstroms thick. Film 46 is discontinuous everywhere except in the I shaped region 45. That is, where film 46 overlaps nucleating layers 42 and 43, film 46 is discontinuous and elsewhere it is continuous. Layers 42, 43 and 44 can, for example, be gold and layer 46 can be indium.

The structure shown can be fabricated in either one of two ways. According to the first technique, layers 41 and 42 are deposited over the entire area of interest. Next, segments 43 and 44 are deposited in a conventional manner through a mask. Finally, layer 46 is deposited. Layer 46 agglomerates and becomes discontinuous everywhere except in area 45. The only critical masks are those used to deposit segments 43 and 44. If the slots in these masks have hairs or burrs at their edges, it causes a decrease in the size of areas 43 and 44. Any decrease in the size of areas 43 and 44 (along their inside edge) causes an increase in the width of conductor 46 since the width of conductor 46 is determined by that portion of layer 42 which is not covered by nucleating layers 43 and 44.

The second technique which can be used to fabricate the structure is to deposit layer 41 and segments 43 and 44 at the same time. A mask which has one relatively large slot (the combined size of areas 43 and 44) with a narrow wire across its center is used. As the nucleating material is deposited through the slot, the area directly beneath the wire receives less gold than areas 43 and 44, but it does receive some nucleating material due to shadowing. The resulting structure is that shown in FIGURES 4A and 4B. There are two areas with relatively thick layers of nucleating material separated by a narrow strip which has a relatively thin layer of nucleating material. Layer 46 is then deposited and it agglomerates and becomes discontinuous everywhere except along the narrow strip 45.

A much narrower conductor can be fabricated by the above described method than by using a mask with a narrow slot therein because one can more easily obtain a narrow uniform wire than a narrow uniform slot.

The methods proposed herein are the inverse of the conventional techniques since according to the methods described herein, a conductor results beneath the area where there is no slot in the mask (which is used to deposit the nucleating layers) whereas with conventional techniques the slot in the mask defines the area which results in a conductor.

Naturally, it should be understood that the present invention is not limited to the particular geometry shown. By the use of masks with a slot which has a grid of wires therein any desired pattern of conductors can be fabricated.

While the invention has been particularly shown and described with reference to a preferred embodiment thereof, it will be understood by those skilled in the art that various changes in form and details may be made therein without departing from the spirit and scope of the invention.

What is claimed is:

1. The method of fabricating a narrow thin film conductor comprising the steps of, depositing a thin layer of gold nucleating material having a tapered edge, a thickness of said nucleating material within a critical range between approximately 5 A. and 10 A. being required to nucleate a given quantity of indium so as to form a continuous film, the thickness of said nucleating layer being in excess of said critical range whereby portions of said tapered edge are within said critical range, and depositing said given quantity of indium at least over said tapered edge to form a continuous film over portions of said tapered edge within said critical range, said given quantity of indium deposited over remaining portions of said nucleating layer agglomerating so as to form a noncontinuous film.

2. The method of claim 1 including the additional step of depositing said given quantity of indium to form a continuous film having a thickness between 1000 A. and 3000 A.

3. The method of fabricating a closed loop thin film pattern of desired geometry comprising the steps of, depositing a pattern of gold nucleating material having a tapered edge and having a contour corresponding to said desired geometry, a thickness of nucleating material with a critical range between approximately 5 A. and 10 A. being required to nucleate a given quantity of indium when deposited thereover so as to form a continuous film, the thickness of said nucleating layer being in excess of said critical range whereby portions of said tapered edge are within said critical range, and depositing said given quantity of indium at least over said tapered edge to form a continuous film over portions of said tapered edge within said critical range, said given quantity of indium agglomerating to form a noncontinuous film over remaining portions of said nucleating layer whereby a continuous closed loop of indium is defined.

4. The method of forming a thin conductive film of desired width comprising the steps of, depositing a thin layer of gold nucleating material having a tapered edge, a thickness of nucleating material within a critical range between approximately 5 A. and 10 A. being required to nucleate a given quantity of indium when deposited thereover so as to form a continuous film, the thickness of said nucleating layer being in excess of said critical range whereby portions of said tapered edge are within said critical range, controlling parameters during deposition of said nuleating layer such that the surface dimension of portions of said tapered edge in said critical range corresponds to the desired width of said thin conductive film, and depositing said given quantity of indium at least over portions of said tapered edge in said critical range to form a continuous film thereover, said given quantity of indium deposited over remaining portions of said nucleating layer agglomerating so as to form a noncontinuous film thereover.

5. The method of fabricating a continuous thin film conductor having a selected width comprising the steps of, depositing two thin film segments of gold onto a substrate, each of said segments having one edge parallel to one edge of the other and spaced at a distance equal to said selected width, a thickness of gold within a critical range between approximately 5 A. and 10 A. being required to nucleate a given quantity of indium deposited thereover so as to form a continuous film, controlling deposition to define the thickness of said segments in excess of said critical range, and depositing said given quantity of indium within the spacing between said segments and over portions of said segments of sufficient thickness to form a continuous thin film on said substrate only within said spacing, said quantity of indium formed over said portions of said segments agglomerating so as to be noncontinuous.

6. The method of claim 5 comprising the additional step of depositing a thickness of gold within said critical range onto said substrate and within the spacing between said segments.

7. The method of fabricating a continuous thin film conductor of desired width comprising the steps of, depositing a layer of gold nucleating material within a critical thickness range onto a substrate, a thickness of nucleating material within a critical range between approximately 5 A. and 10 A. being required to nucleate a given quantity of indium when deposited thereover, said given quantity of indium agglomerating when deposited over a layer of said nucleating material beyond said critical range, depositing two segments of gold nucleating material over said nucleating layer each having one edge parallel to one edge of the other and spaced therefrom at a distance equal to the desired width of said thin film, the combined thickness of said nucleating layer and said nucleating segments being in excess of said critical range, and depositing said given quantity of indium within said spacing between said nucleating segments and over portions of said nucleating segments so as to form a continuous thin film over said thin layer of nucleating material exposed within said spacing.

8. The method of fabricating a thin film conductor of selected width comprising the steps of, depositing a thin layer of gold nucleating material through a mask having a slot with a wire across said slot, a thickness of nucleating material within a critical range between approximately 5 A. and 10 A. being required to nucleate a given quantity of indium when deposited thereover, the diameter of said wire being equal to the selected width of said thin film conductor, controlling parameters to limit the thickness of said nucleating layer under said wire to within said critical range and to determine the thickness of remaining portions of said nucleating layer in excess of said critical range, and depositing said given quantity of indium at least over portions of said nucleating layer having a thickness within said critical range so as to form a continuous thin film thereover.

References Cited by the Examiner

UNITED STATES PATENTS

| | | | |
|---|---|---|---|
| 2,455,513 | 12/1948 | McGee | 117—212 X |
| 2,815,462 | 12/1957 | Auphan | 117—212 X |
| 2,948,261 | 8/1960 | McGraw | 118—49 |
| 3,091,556 | 5/1963 | Behrndt et al. | 117—107.1 |

OTHER REFERENCES

Holland: "Vacuum Deposition of Thin Films," 1956, John Willey and Sons, New York, N.Y., pages relied on 203 and 257–260.

JOSEPH B. SPENCER, *Primary Examiner.*

RICHARD D. NEVIUS, *Examiner.*